United States Patent
Bendyk et al.

(10) Patent No.: US 10,659,348 B2
(45) Date of Patent: *May 19, 2020

(54) HOLDING OF A LINK IN AN OPTICAL INTERFACE BY A LOWER LEVEL PROCESSOR UNTIL AUTHORIZATION IS RECEIVED FROM AN UPPER LEVEL PROCESSOR

(71) Applicant: International Business Machines Corporation, Armonk, NY (US)

(72) Inventors: Mark P. Bendyk, New York, NY (US); Charles S. Cardinell, Tucson, AZ (US); Roger G. Hathorn, Tucson, AZ (US); Steven E. Klein, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,010

(22) Filed: Mar. 7, 2018

(65) Prior Publication Data
US 2018/0198703 A1 Jul. 12, 2018

Related U.S. Application Data

(63) Continuation of application No. 14/870,422, filed on Sep. 30, 2015, now Pat. No. 9,942,134.

(51) Int. Cl.
*H04L 12/703* (2013.01)
*H04L 12/939* (2013.01)

(52) U.S. Cl.
CPC .............. *H04L 45/28* (2013.01); *H04L 49/55* (2013.01)

(58) Field of Classification Search
CPC .......... H04L 45/28; H04L 49/55; H04L 45/00
See application file for complete search history.

(56) References Cited

U.S. PATENT DOCUMENTS

| 5,553,302 | A | 9/1996 | Morrissey et al. |
| 6,115,361 | A | 9/2000 | Fredericks et al. |
| 6,697,325 | B1 * | 2/2004 | Cain ....................... H04L 45/02 370/217 |
| 7,020,814 | B2 | 3/2006 | Ryle et al. |
| 7,023,873 | B2 | 4/2006 | Gibson et al. |

(Continued)

FOREIGN PATENT DOCUMENTS

WO  WO2014207436  12/2014

OTHER PUBLICATIONS

Information Technology—Fibre Channel Protocol for SCSI, Fourth Version (FCP-4), American National Standard T10 Project 1828-D, Revision 02b, Jan. 3, 2011, pp. 147.

(Continued)

*Primary Examiner* — Mohamed A Kamara
(74) *Attorney, Agent, or Firm* — Rabindranath Dutta; Konrad Raynes Davda & Victor LLP

(57) ABSTRACT

A lower level processor holds a link, in response to detecting a link down condition of the link. In response to the holding of the link, the lower level processor transmits a command to an upper level processor indicating the link down condition of the link. The lower level processor initiates a process of link recovery for the link, in response to receiving an authorization from the upper level processor.

20 Claims, 9 Drawing Sheets

(56) References Cited

U.S. PATENT DOCUMENTS

| | | |
|---|---|---|
| 7,079,551 B2 | 7/2006 | Shivnan |
| 7,152,178 B1 | 12/2006 | Vook et al. |
| 7,917,030 B2 | 3/2011 | BuAbbud et al. |
| 2002/0044561 A1 | 4/2002 | Coffey |
| 2006/0050643 A1 | 3/2006 | Yoshimoto et al. |
| 2007/0143522 A1 | 6/2007 | Wilkinson et al. |
| 2008/0112311 A1 | 5/2008 | Hariharan et al. |
| 2010/0260041 A1 | 10/2010 | Yan et al. |
| 2012/0039341 A1 | 2/2012 | Latif et al. |
| 2012/0297157 A1 | 11/2012 | Iwamura et al. |
| 2017/0093694 A1 | 3/2017 | Bendyk et al. |

OTHER PUBLICATIONS

Fibre Channel Single-Byte Command Code Sets Mapping Protocol—5 (FC-SB-5), Rev. 2.00, American National Standard for Information Technology, Mar. 26, 2013, pp. 269.

"Fibre Channel Link Service (FC-LS-3)", Rev. 3.10, American National Standard for Information Technology, Feb. 1, 2014, pp. 207.

"Fibre Channel Framing and Signaling—4 (FC-FS-4)", Rev. 1.20, American National Standard for Information Technology, Jul. 21, 2015, pp. 463.

U.S. Appl. No. 14/870,385, filed Sep. 30, 2015, by inventors R.G. Hathorn, B.W. Holley, and S.E. Klein.

U.S. Appl. No. 14/870,393, filed Sep. 30, 2015, by inventors C.S. Cardinell, R.G. Hathorn, S.E. Klein and B. Laubli.

U.S. Appl. No. 14/870,410, filed Sep. 30, 2015, by inventors C.S. Cardinell, R.G. Hathorn, S.E. Klein and B. Laubli.

U.S. Appl. No. 14/870,549, filed Sep. 30, 2015, by inventors R.G. Hathorn, S.E. Klein and M.W. Welsh.

U.S. Appl. No. 14/870,554, filed Sep. 30, 2015, by inventors R.G. Hathorn, S.E. Klein and M.W. Welsh.

U.S. Appl. No. 14/870,569, filed Sep. 30, 2015, by inventors R.G. Hathorn, S.E. Klein and M.W. Welsh.

U.S. Appl. No. 14/870,422, filed Sep. 30, 2015.

Office Action dated 202017-02-21, pp. 13, for U.S. Appl. No. 14/870,422, filed Sep. 30, 2015.

Amendment dated Jul. 18, 2017, pp. 8, to Office Action dated Feb. 21, 2017, pp. 13, for U.S. Appl. No. 14/870,422, filed Sep. 30, 2015.

Notice of Allowance dated Jul. 18, 2017, pp. 13, for U.S. Appl. No. 14/870,422, filed Sep. 30, 2015.

Notice of Allowance dated Dec. 6, 2017, pp. 9, for U.S. Appl. No. 14/870,422, filed Sep. 30, 2015.

List of IBM Patents or Patent Applications Treated as Related, dated Mar. 7, 2018, pp. 2.

\* cited by examiner

HOLDING OF A LINK IN AN OPTICAL INTERFACE BY A LOWER LEVEL PROCESSOR UNTIL AUTHORIZATION IS RECEIVED FROM AN UPPER LEVEL PROCESSOR

CROSS-REFERENCE TO RELATED APPLICATION

This application is a continuation of U.S. patent application Ser. No. 14/870,422, filed Sep. 30, 2015, which application is incorporated herein by reference in its entirety.

BACKGROUND

1. Field

Embodiments relate to the holding of a link in an optical interface by a lower level processor until authorization is received from an upper level processor.

2. Background

A storage controller may control access to storage for one or more host computational devices that may be coupled to the storage controller over a network. A storage management application that executes in the storage controller may manage a plurality of storage devices, such as disk drives, tape drives, flash drives, etc., that are coupled to the storage controller. A host may send Input/Output (abbreviated as I/O or IO) commands to the storage controller and the storage controller may execute the I/O commands to read data from the storage devices or write data to the storage devices.

A host bus adapter (HBA) may comprise a circuit board and/or integrated circuit based adapter that may include components such as a Fibre Channel interface chip, where the Fibre Channel interface chip may be referred to as an embedded port. The host bus adapter may provide I/O processing and provide physical connectivity for the storage controller to a storage area network (SAN), where the storage area network includes a Fibre Channel switched fabric. The storage controller (via the host bus adapter) may act as a target that receives I/O commands from the one or more host computational devices, where the one or more host computational devices act as initiators of the I/O commands.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks. Fibre Channel Protocol (FCP) is a transport protocol that predominantly supports transports commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 layer of the FC standard is intended to provide the common services for features such as striping, multicasting, etc.

FC-4, the highest layer in Fibre Channel, defines the application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

Fibre Connection (FICON) is a protocol of the fibre channel architecture and may also be referred to by the formal name of FC-SB-5. FICON is a protocol layer that builds upon the Fibre Channel transport protocol. Further details of Fibre Channel protocol mapping for the Single-Byte Command Code Sets may be found in the publication, "Fibre Channel Single-Byte Command Code Sets Mapping Protocol-5 (FC-SB-5)", Rev. 2.0, published by the American National Standards Institute on Mar. 26, 2013.

The basic building blocks of a Fibre Channel connection are called "Frames". The frames contain the information to be transmitted (Payload), the address of the source (i.e., initiator) and destination (i.e., target) ports and link control information. Frames are broadly categorized as data frames and link control frames. Details of framing and signaling aspects of Fibre Channel may be found in the publication, "Fibre Channel Framing and Signaling-4 (FC-FS-4)", Rev. 1.20, published by the American National Standard for Information Technology on Jul. 21, 2015. Details of link services aspects of Fibre Channel may be found in the publication, "Fibre Channel Link Services (FC-LS-3)", Rev. 3.10, published by the American National Standard for Information Technology on Feb. 1, 2014. The Fibre Channel Protocol for SCSI Fourth Version (FCP-4) standard describes the frame format and protocol definitions required to transfer commands and data between a SCSI (Small Computer System Interface) initiator and target using the Fibre Channel family of standards. Further details of FCP-4 may be found in the publication, "Information Technology—Fiber Channel Protocol for SCSI, Fourth Version (FCP-4), Revision 02b" published by the International Committee for Information Technology Standards, on Jan. 3, 2011.

The storage controller may include a plurality of host bus adapters, where each host bus adapter may include a Fibre Channel Interface chip that is an interface to switches that allow communication over a Fibre Channel network between the storage controller and the plurality of hosts.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

Fibre Channel login takes place after a link is operational and the login may an extended link service protocol. Port login is a type of Fibre Channel login that is also known as PLOGI. Port login is used to establish a session between two N_Ports (devices) and is necessary before any upper level (i.e., upper layer) commands or operations can be performed. During the port login, two N_Ports (devices) swap service parameters and make themselves known to each other.

SUMMARY OF THE PREFERRED EMBODIMENTS

Provided are a method, a system, and a computer program product in which a lower level processor holds a link, in response to detecting a link down condition of the link. In response to the holding of the link, the lower level processor transmits a command to an upper level processor indicating the link down condition of the link. The lower level processor initiates a process of link recovery for the link, in response to receiving an authorization from the upper level processor.

In certain embodiments, the lower level processor processes lower level layers of a protocol stack, and the upper level processor processes upper layers of the protocol stack.

In additional embodiments, the protocol stack is for Fibre Channel, wherein the lower level layers include framing and signaling services, and wherein the upper level layers include at least one or more of extended link services, fabric services, Fibre Channel Protocol (FCP), and Fiber Connection (FICON).

In further embodiments, the upper level processor is a driver that is included in a host bus adapter of as storage controller, and the lower level processor is a port firmware of an embedded port comprising a Fibre Channel interface chip embedded in the host bus adapter.

In certain embodiments, the upper level processor on receiving the command indicating the link down condition of the link performs recovery actions including notifications to protocols layers to terminate active input/output (I/O) operations. The upper level processor sends the authorization to initiate the process of link recovery for the link to the lower level processor, subsequent to completing the recovery actions.

In further embodiments, the link is to a transmitter, wherein the holding of the link by the lower level processor is for the transmitter, and wherein the link is held by the lower level processor by transmitting IDLE ordered sets in Fibre Channel to indicate that an operational port facility ready for frame transmission and reception exists.

In additional embodiments, in response to determining that the detected link down condition of the link is being caused by receipt of a Not Operational Sequence (NOS), the lower level processor transmits an Offline Sequence (OLS) in Fibre Channel and performs the holding of the link until receiving the authorization to perform link recovery from the upper level processor. Additionally, in response to determining that the detected link down condition of the link is being caused by a loss of signal or loss of synchronization, the lower level processor transmits an offline sequence (OLS) in Fibre Channel and performs the holding of the link until receiving the authorization to perform link recovery or link reinitialization from the upper level processor.

BRIEF DESCRIPTION OF THE DRAWINGS

Referring now to the drawings in which like reference numbers represent corresponding parts throughout.

DETAILED DESCRIPTION

Figure 1:
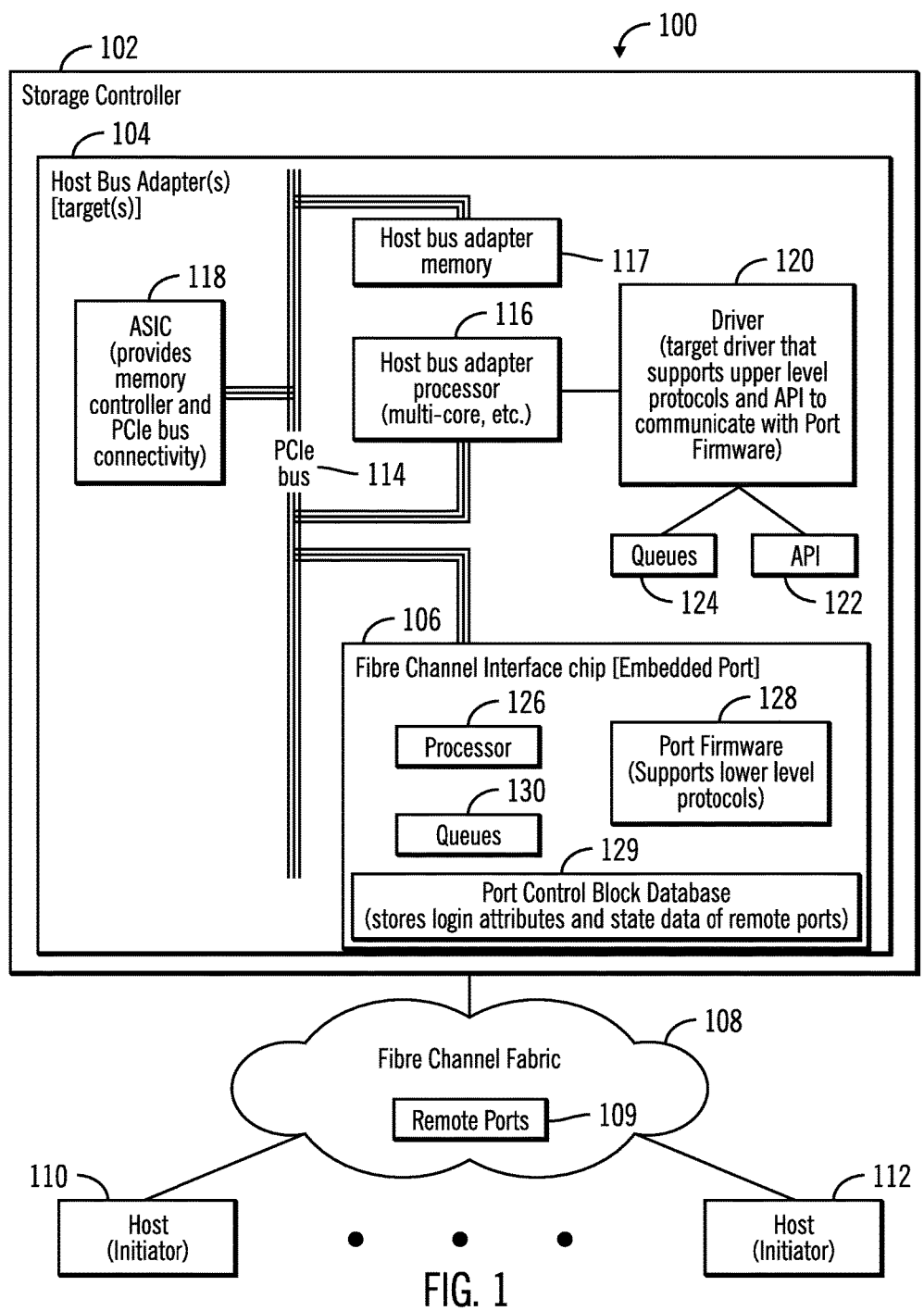
FIG. 1 illustrates a block diagram of a computing environment comprising a storage controller that includes one or more host adapters with one or more Fibre Channel interface chips to couple the storage controller to a Fibre Channel fabric to communicate with a plurality of hosts, in accordance with certain embodiments.

In the following description, reference is made to the accompanying drawings which form a part hereof and which illustrate several embodiments. It is understood that other embodiments may be utilized and structural and operational changes may be made.

Certain embodiments provide mechanisms for the management of optical link transitions between processing elements that manage different layers of a protocol stack, where the optical link transitions may include among other transitions a change the status of a link from an online state to an offline state or vice versa. Such optical link transitions that are managed may include link transitions in a Fibre Channel link, an Ethernet link, etc.

For example, in certain embodiments a processing element for a port may manage the lower layer protocol stacks, such as the framing and signaling layers of Fibre Channel. The processing element for the port that may be referred to as a lower level processor may include the firmware for the port, where in certain embodiments the port may comprise an embedded port in a host bus adapter of a storage controller or a non-embedded port.

An upper layer processing element may manage upper layer protocols that run on Fibre channel, such as extended link services, fabric services, FCP, FICON, etc. In certain embodiments, the upper layer processing element may include an upper level processor, such as a driver for a host bus adapter of a storage controller.

When a link transition from an online to an offline or link failure condition occurs, the lower level processor notifies the upper level processor of the link down event. If the upper level processor is polling for this notification on an input queue, it is possible that the link condition could change one or more times before the link down event is processed. This makes it difficult to manage multiple link transitions (referred to as bouncing) that sometimes occur when link transitions occur and may result in lost link transitions and improper management of the link. If additional new I/O requests are received between link transitions, then allowing the multiple link to link transitions to occur while attempting to recover the input/output (I/O) that was in progress at the time of the link down event is time consuming and error prone.

Certain embodiments provide an interface between the lower level processor and the upper level processor to process the link down notification to the upper level processor. In response to the occurrence of a link down condition, the lower level processor notifies the upper level processor of the link down condition and the lower level processor holds the link in the proper link failure or offline state until the upper level processor responds to the link down condition with a message that allows the link recovery to proceed. Therefore, in certain embodiments in an optical communications interface having a lower level processor, upon failure of a link the lower level processor holds the link to prevent link transitions until the upper level provides authorization to the lower level processor for completing the process of link recovery.

Exemplary Embodiments

FIG. 1 illustrates a block diagram of a computing environment 100 comprising a storage controller 102 that includes one or more host adapters 104 with one or more Fibre Channel interface chips 106 to couple the storage controller 102 to a Fibre Channel fabric 108, to communicate with a plurality of hosts 110, 112, in accordance with certain embodiments.

The storage controller 102 that includes the host bus adapter 104 may control storage devices (not shown), and receive I/O commands from the hosts 110, 112. The storage controller 102 and the hosts 110, 112 may comprise any suitable computational device including those presently known in the art, such as, a personal computer, a workstation, a server, a mainframe, a hand held computer, a palm top computer, a telephony device, a network appliance, a blade computer, a processing device, etc. In certain embodiments the storage controller 102 may be comprised of one or more storage servers. A plurality of storage servers may provide redundancy because if one storage server undergoes a failure from which recovery is not possible, an alternate storage server may perform the functions of the storage server that failed. The storage controller 102 and the hosts 110, 112 may be elements in any suitable network, such as, a storage area network, a wide area network, the Internet, an intranet. In certain embodiments, the storage controller 102 and the hosts 110, 112 may be elements in a cloud computing environment.

In FIG. 1, the storage controller 102 may include one or more host bus adapters 104 that operate as targets of I/O operations initiated by one or more hosts 110, 112. The host bus adapter 104 does not have control over the arrival of host I/O operations. In certain embodiments, each host bus adapter 104 may be in the form of an adapter card that is plugged into the Peripheral Component Interconnect Express (PCIe) slot of the storage controller 102.

The host bus adapter 104 may include a PCIe bus 114 to which a host bus adapter processor 116, a host bus adapter memory 117, and the Fibre Channel interface chip 106 are coupled. An ASIC 118 may reside in the host bus adapter 104, where the ASIC 118 provides a memory controller and PCIe bus connectivity.

The host bus processor 116 may be a single-core or a multi-core processor. A driver 120 that supports upper level protocols e.g., FCP, FICON, FC-4 layer standards, etc., executes operations on the host bus adapter processor 116. The host bus adapter memory 117 may comprise any suitable memory known in the art such as a Random Access Memory (RAM), a dynamic RAM (DRAM), flash memory, etc. The driver 120 communicates with the Fibre Channel interface chip 106 by using an application programming interface (API) 122. Various data structures, such as queues 124 are maintained by the driver 120. In certain embodiments, the driver 120 may be implemented in software, hardware, firmware or any combination thereof.

The Fibre Channel Interface Chip 106 is also referred to as an embedded port. The embedded port 106 includes a processor 126 and a port firmware 128 that supports lower level protocols like those for framing, signaling, etc. In certain embodiments, functions of the port firmware 128 may be implemented in software, hardware, firmware or any combination thereof. Various data structures, such as queues 130 (e.g., request queues) are maintained by the port firmware 128. The embedded port 106 supports lower level protocols of Fibre Channel and the driver 120 supports upper level protocols. The embedded port 106 that supports lower level protocols of Fibre Channel connects the host bus adapter 104 to the Fibre Channel fabric 108.

The embedded port 106 includes a port control block database 129 that is maintained by the port firmware 128. The port control block database 129 stores login attributes and state data of remote ports 109 (in the Fibre Channel Fabric 108) that may have logged in to the embedded port 106.

The hosts 110, 112 may send I/O commands to the storage controller 102 over the Fibre Channel fabric 108. The embedded port 106 receives the Fibre Channel frames corresponding to the request. The driver 120 which supports upper level protocols of Fibre Channel is in communication with the embedded port 106. The driver 120 uses the embedded port 106 and communicates via the upper level protocols with the hosts 110, 112, and responds to I/O commands via the embedded port 106.

Therefore, FIG. 1 illustrates certain embodiments in which a driver 120 of a host bus adapter 104 in association with the port firmware 128 of an embedded port 106 allows the host bus adapter 104 to process and respond to I/O commands from one or more hosts 110, 112.

Figure 2:
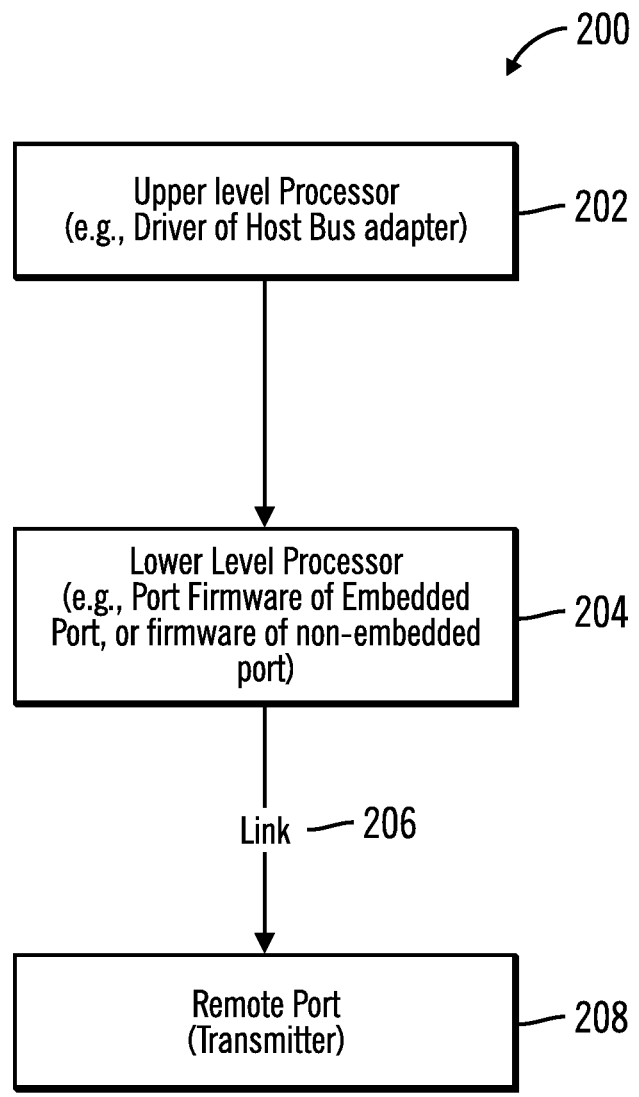
FIG. 2 illustrates a block diagram that shows an upper level processor and a lower level processor that has a link to a remote port over a network, in accordance with certain embodiments.

FIG. 2 illustrates a block diagram 200 that shows an upper level processor 202 and a lower level processor 204 that has a link 206 to a remote port 208, in accordance with certain embodiments. In certain embodiments, the remote port 208 is an F_Port in a Fibre Channel fabric or a directly connected N Port. A link down may be caused by a link transition from an online to an offline or a link failure condition, between an embedded port and the remote port 208.

In certain embodiments, the upper level processor 202 may comprise the driver 120 of the host bus adapter 104 that is included in the storage controller 102. The upper level processor 202 may process upper layer protocol stacks of Fibre channel, such as extended link services, fabric services, FCP, FICON, etc.

In certain embodiments, the lower level processor 204 may comprise the port firmware 128 that manages the operations of the embedded port (e.g., Fibre Channel Interface Chip) 106 that is embedded within the host bus adapter 104 of the storage controller 102. In alternative embodiments the port managed by the lower level processor 204 may be a non-embedded port (i.e., a standalone port not included in the host bus adapter 104). The lower level processor 204 may manage the lower layer protocol stacks, such as the framing and signaling layers of Fibre Channel.

In certain embodiments, the lower level processor 204 manages the link 206 established between the port 106 being managed by the lower level processor 204 and the remote port 208 in the network 210, where the network 210 may be comprised of a Fibre Channel fabric. The remote port 208 may act as a transmitter (e.g., a Fibre Channel F_Port) over the link 206 to the lower level processor 204.

Figure 3:
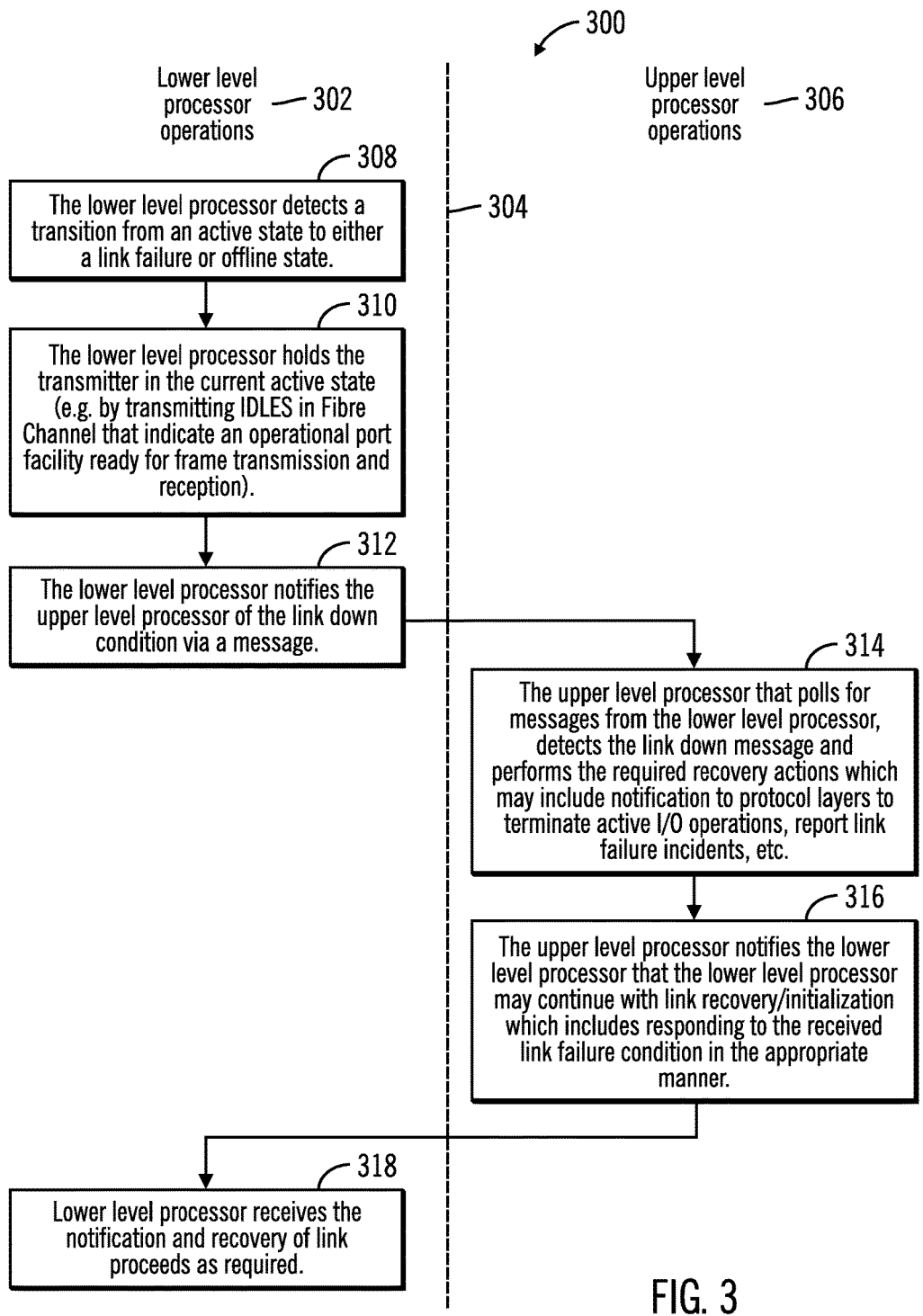
FIG. 3 illustrates a first flowchart that shows operations of a lower level processor and an upper level processor, in accordance with certain embodiments.

FIG. 3 illustrates a first flowchart 300 that shows operations of a lower level processor 204 and an upper level processor 202, in accordance with certain embodiments. The lower level processor operations 302 are shown to the left of the dashed vertical line 304 and the upper level processor operations 306 are shown to the right of the dashed vertical line 304.

Control starts at block 308 in which the lower level processor 204 detects a transition from an active state to either a link failure state or offline state for the link 206. The lower level processor 204 holds (at block 310) the transmitter 208 in the current active state. For example, the transmitter 208 may be held in the current active state by transmitting IDLES in Fibre Channel that indicate an operational port facility ready for frame transmission and reception. Control proceeds to block 312, in which the lower level processor 204 uses a message to notify the upper level processor 202 of the link down condition.

The upper level processor 202 that polls for messages from the lower level processor, detects (at block 314) the link down message and performs recovery actions which may include notification to protocol layers to terminate active I/O operations, report link failure incidents, etc. Control proceeds to block 314 in which the upper level processor 202 notifies the lower level processor 204 that the lower level processor 204 may continue with link recovery or link initialization which includes responding to the received link failure condition in the appropriate manner.

From block 316 control proceeds to block 318 in which the lower level processor 204 receives the notification and the process for the recovery of the link 206 is performed via the lower level processor 204.

Therefore FIG. 3 illustrates certain embodiments in which the lower level processor 204 in cooperation with the upper level processor 202 holds links that are in a failed or offline state to prevent link transitions until the upper level processor 202 completes required recovery actions such as notifications to protocol layers to terminate active I/O operations, etc.

Figure 4:
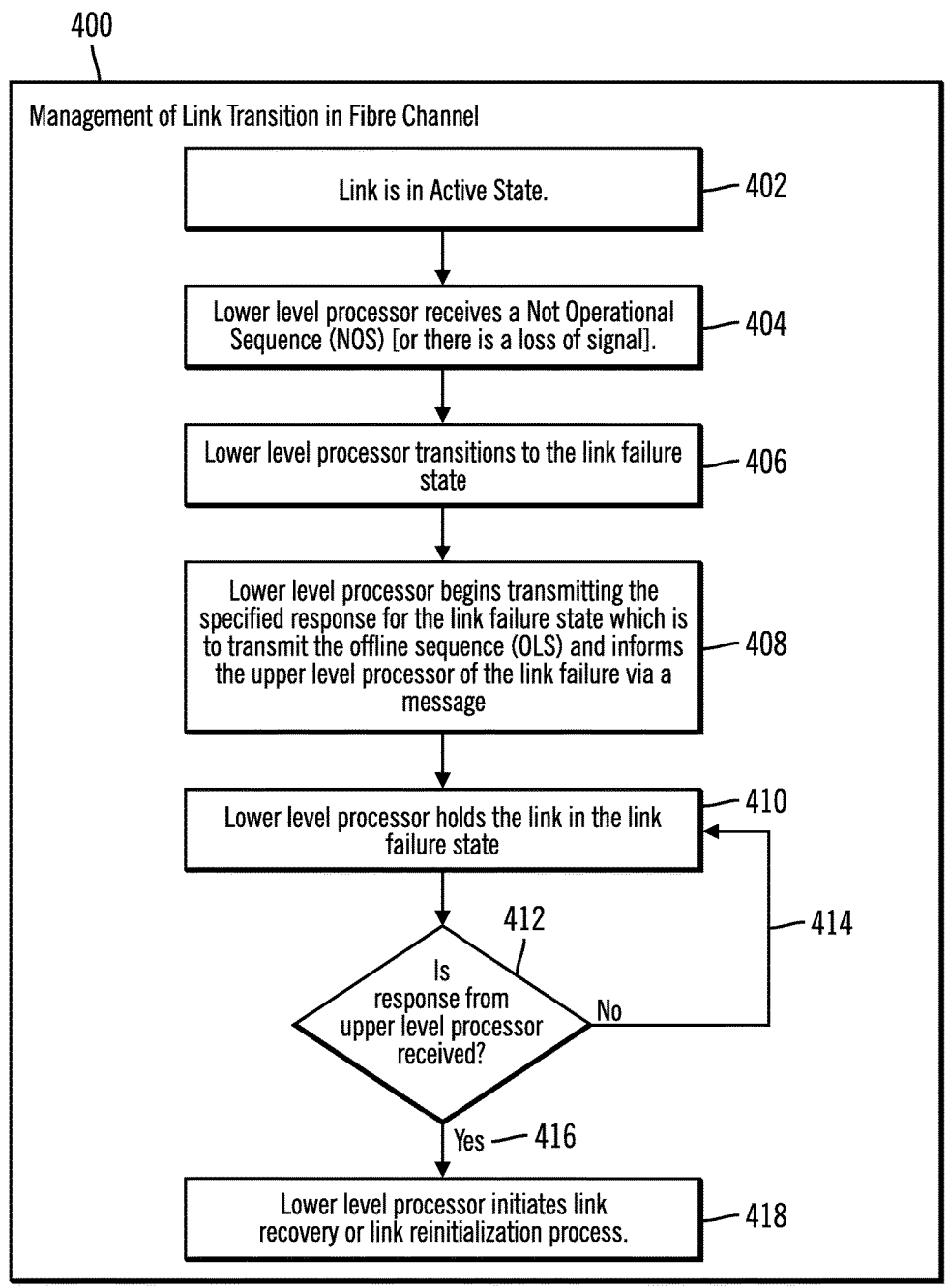
FIG. 4 illustrates a second flowchart that shows operations of a lower level processor, in accordance with certain embodiments.

FIG. 4 illustrates a second flowchart that shows operations 400 of a lower level processor for managing link transitions in Fibre Channel, in accordance with certain embodiments. The operations shown in FIG. 4 may be performed by the lower level processor 204, such as the port firmware 128 of the Fibre channel interface chip 106.

Control starts at block 402 in which the link 206 is determined to be in an active state by the lower level processor 204. Control proceeds to block 404 in which the lower level processor 204 receives a Not Operational Sequence (NOS) [or there is a loss of signal in certain other embodiments] to indicate that the link 206 is not operational. The lower level processor 204 transitions the link 206 to the link failure state (at block 406), and begins transmitting (at block 408) the specified response for the link failure state which is to transmit the offline sequence (OLS) in Fibre Channel. The lower level processor 204 also informs the upper level processor 202 of the link failure via a message.

From block 408 control proceeds to block 410 in which the lower level processor 204 holds the link 206 in the link failure state. The lower level processor 204 determines (at block 412) whether a response has been received from the upper level processor 202 authorizing the lower level processor 204 to initiate link recovery or link reinitialization.

If at block 412, the lower level processor 204 determines that no response has been received from the upper level processor 202 authorizing the lower level processor 204 to initiate link recovery or link reinitialization, control returns to block 410 via the "No" branch 414 from block 412, and the lower level processor 204 continues to hold the link 206 in the offline state.

If at block 412, the lower level processor 204 determines that a response has been received from the upper level processor 202 authorizing the lower level processor 204 to initiate link recovery or link reinitialization, the "Yes" branch 416 from block 412 is taken and control proceeds to block 418 in which the lower level processor 204 initiates a link recovery or link reinitialization process for the link 206.

Therefore, FIG. 4 shows how the lower level processor 204 holds a link 206 until the lower level processor 204 receives an authorization from the upper level processor 202 to continue with link recovery or reinitialization.

Figure 5:
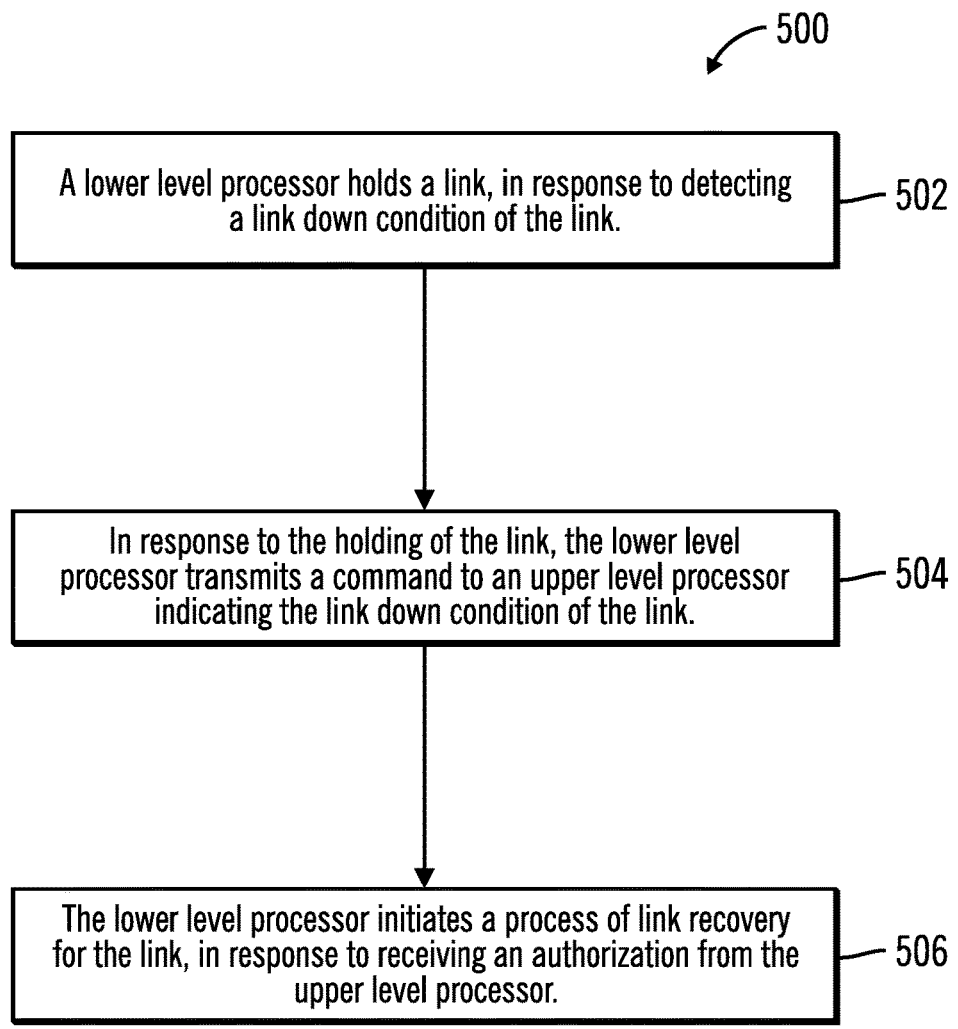
FIG. 5 illustrates a third flowchart that shows operations of a lower level processor, in accordance with certain embodiments.

FIG. 5 illustrates a third flowchart 500 that shows operations of a lower level processor 204, in accordance with certain embodiments. The operations shown in FIG. 5 may be performed by the lower level processor 204, such as the port firmware 128 of the Fibre channel interface chip 106.

Control starts at block 502 in which a lower level processor 204 holds a link 206, in response to detecting a link down condition of the link 206. In response to the holding of the link 206, the lower level processor 204 transmits (at block 504) a command to an upper level processor 202 indicating the link down condition of the link 206. The lower level processor 204 initiates a process of link recovery for the link, 206 in response to receiving (at block 506) an authorization from the upper level processor.

Figure 6:
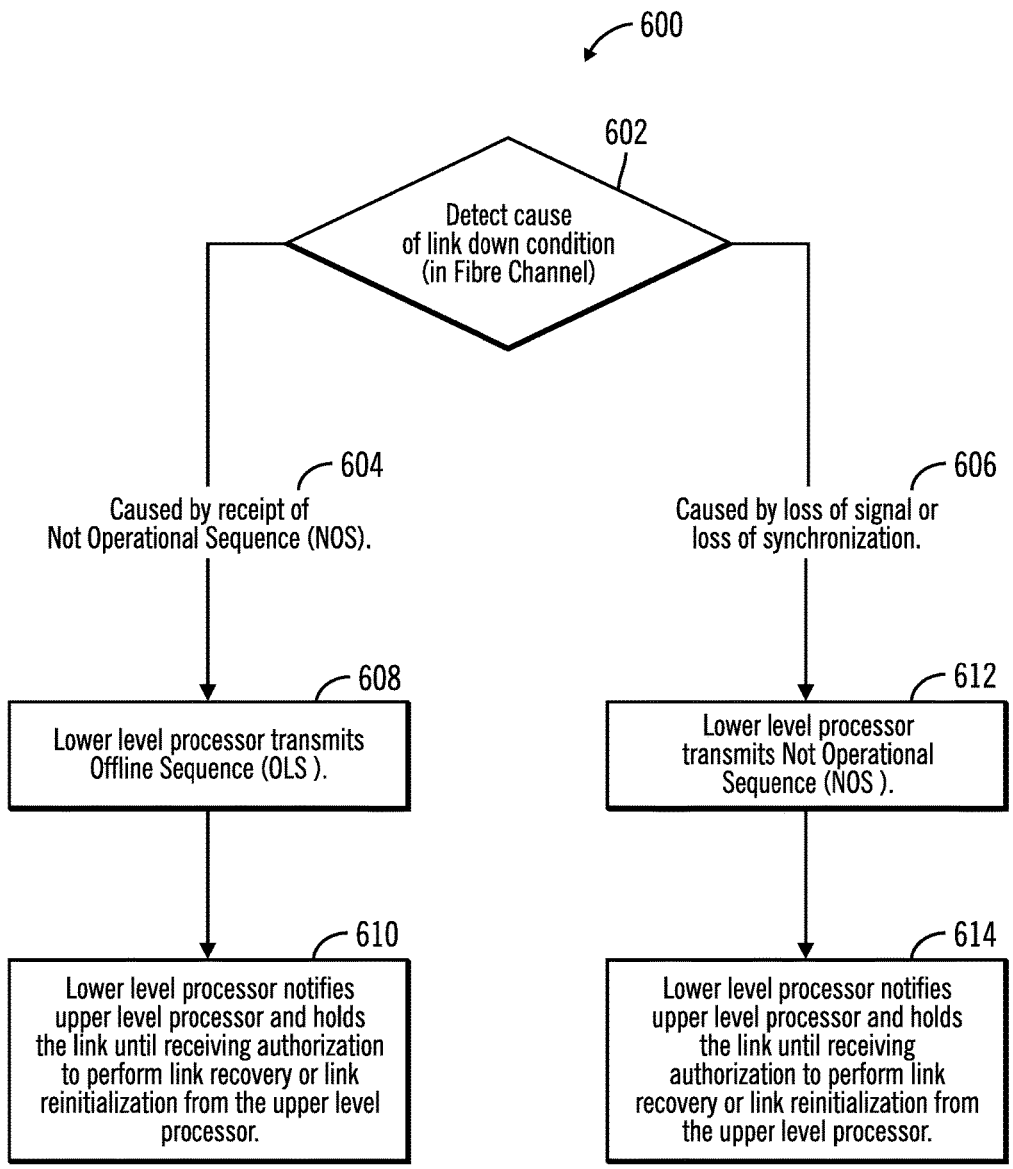
FIG. 6 illustrates a fourth flowchart that shows operations of a lower level processor, in accordance with certain embodiments.

FIG. 6 illustrates a fourth flowchart 600 that shows operations of a lower level processor, in accordance with certain embodiments. The operations shown in FIG. 6 may be performed by the lower level processor 204, such as the port firmware 128 of the Fibre channel interface chip 106.

In FIG. 6, in response to determining (at block 602) that the detected link down condition of the link is being caused by receipt of a Not Operational Sequence (NOS) [shown via reference numeral 604], the lower level processor 204 transmits (at block 608) an Offline Sequence (OLS) in Fibre Channel and performs the holding of the link until receiving the authorization to perform link recovery or link reinitialization from the upper level processor 202 (as shown in block 610).

Additionally, in response to determining (at block 602) that the detected link down condition of the link is being caused by a loss of signal or loss of synchronization (shown via reference numeral 606), the lower level processor 204 transmits (at block 612) an offline sequence (OLS) in Fibre Channel and performs the holding of the link until receiving the authorization to perform link recovery or link reinitialization from the upper level processor 202 (as shown via reference numeral 614).

Therefore, FIGS. 1-6 illustrate certain embodiments in which a lower level processor 204 in coordination with a higher level processor 202 holds links that have failed until the lower level processor 204 receives an authorization from the upper level processor 202 to initiate the process of link recovery. The upper level processor provides 202 the authorization to the lower level processor 204 to initiate the process of link recovery, after the upper level processor 202 has completed performing the recovery actions such as notifications to protocol layers to terminate active I/O operations, in response to a notification from the lower level processor 204 of the failure of the link. Avoiding repeated link transitions by holding the link improves the processing speed for the computing environment 100.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
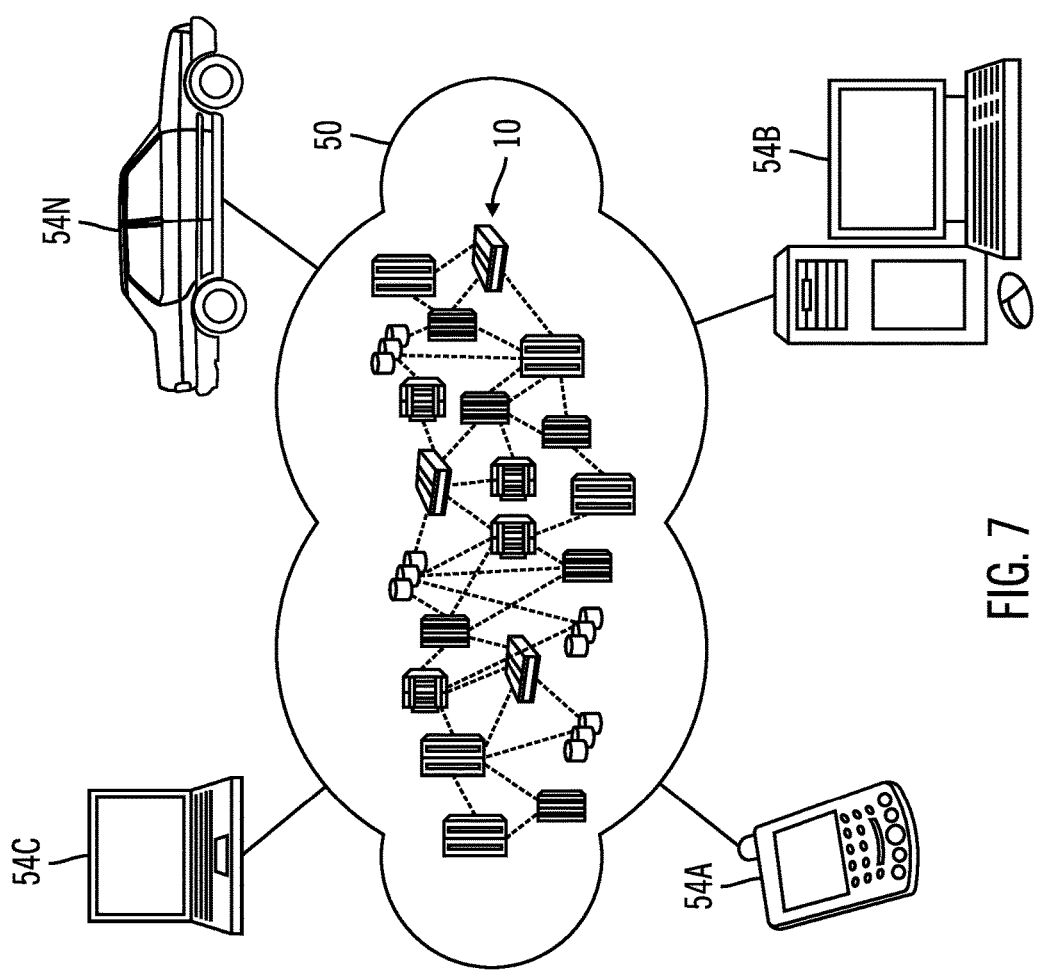
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
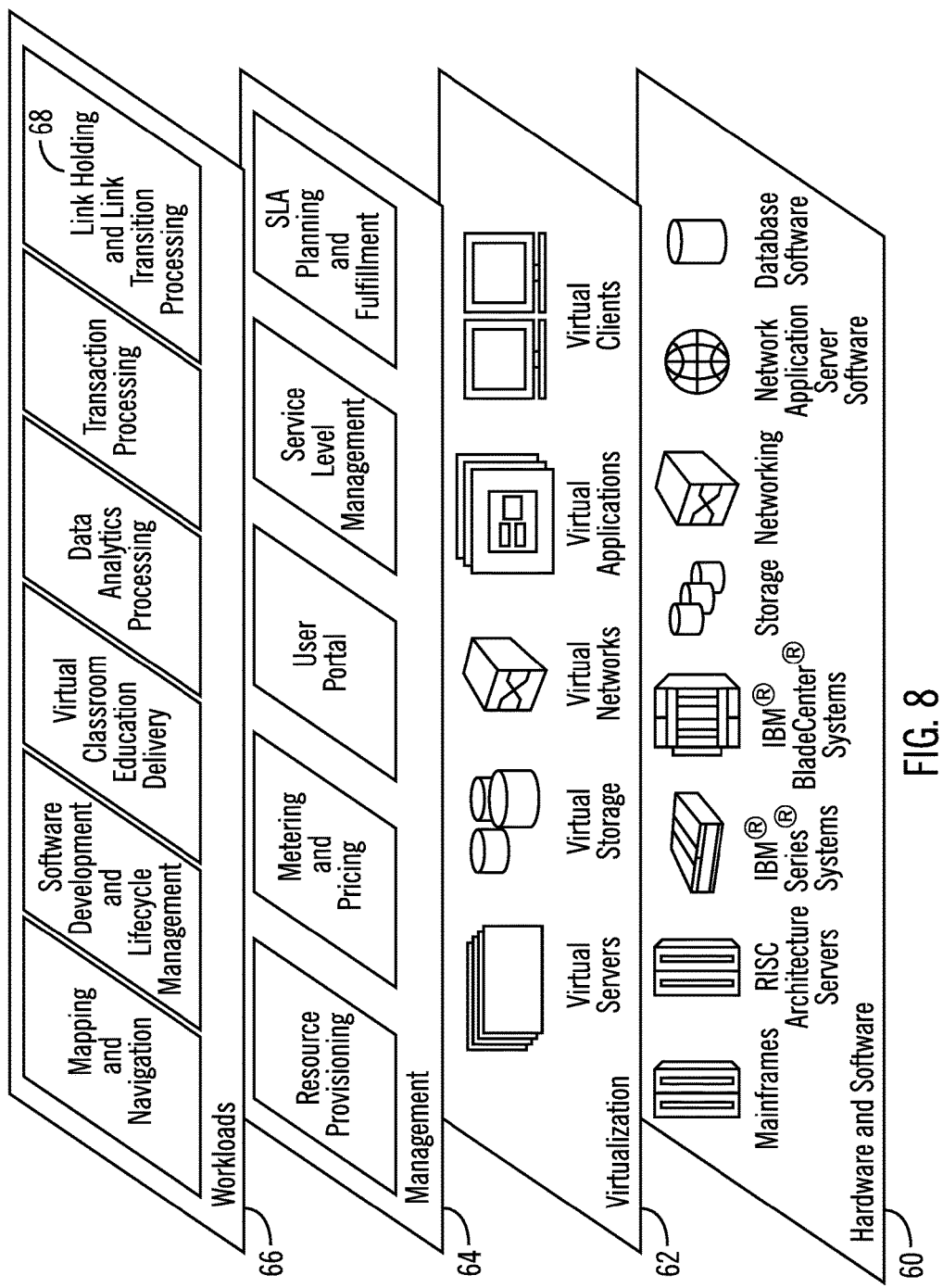
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the link holding and link transition processing 68 as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
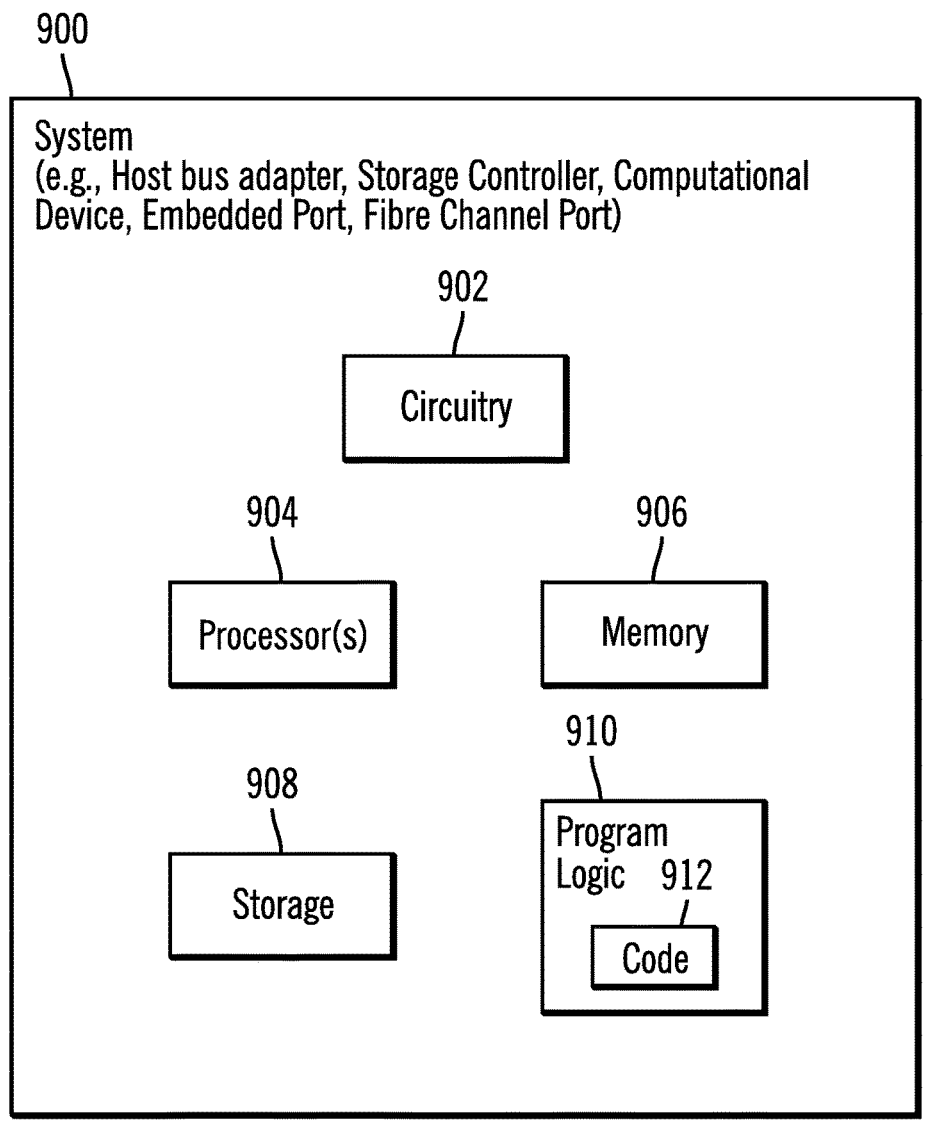
FIG. 9 illustrates a block diagram of a computational system that shows certain elements that may be included in the storage controller, the host bus adapter, the embedded port or a non-embedded port, and the host shown in FIG. 1, in accordance with certain embodiments.

FIG. 9 illustrates a block diagram that shows certain elements that may be included in the host bus adapter 104, the storage controller 102, the embedded port 106, a Fibre Channel port, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

* IBM, zSeries, pSeries, xSeries, BladeCenter, WebSphere, and DB2 are trademarks of International Business Machines Corporation registered in many jurisdictions worldwide.

What is claimed is:

1. A method, comprising:
   in response to detecting a link down condition of a link, holding the link by a lower level processor by transmitting an indication to indicate that an operational port facility that is ready for frame transmission and reception exists;
   in response to the holding of the link, transmitting, by the lower level processor, a command to an upper level processor indicating the link down condition of the link; and
   initiating, by the lower level processor, a process of link recovery for the link, in response to receiving an authorization from the upper level processor.

2. The method of claim 1, wherein the lower level processor processes lower level layers of a protocol stack, and wherein the upper level processor processes upper layers of the protocol stack.

3. The method of claim 2, wherein the protocol stack is for Fibre Channel, wherein the lower level layers include framing and signaling services, and wherein the upper level layers include at least one or more of extended link services, fabric services, Fibre Channel Protocol (FCP), and Fiber Connection (FICON).

4. The method of claim 3, wherein the upper level processor is a driver that is included in a host bus adapter of as storage controller, and wherein the lower level processor is a port firmware of an embedded port comprising a Fibre Channel interface chip embedded in the host bus adapter.

5. The method of claim 1, wherein the upper level processor on receiving the command indicating the link down condition of the link performs:
   recovery actions including notifications to protocols layers to terminate active input/output (I/O) operations; and
   sending the authorization to initiate the process of link recovery for the link to the lower level processor, subsequent to completing the recovery actions.

6. The method of claim 1, wherein the link is to a transmitter, and wherein the holding of the link by the lower level processor is for the transmitter, and wherein the link is held by the lower level processor by transmitting the IDLE ordered sets in Fibre Channel to indicate that an operational port facility ready for frame transmission and reception exists.

7. The method of claim 1, the method further comprising:
   in response to determining that the detected link down condition of the link is being caused by receipt of a Not Operational Sequence (NOS), the lower level processor transmits an Offline Sequence (OLS) in Fibre Channel and performs the holding of the link until receiving the authorization to perform link recovery or link reinitialization from the upper level processor; and
   in response to determining that the detected link down condition of the link is being caused by a loss of signal or loss of synchronization, the lower level processor transmits an offline sequence (OLS) in Fibre Channel and performs the holding of the link until receiving the authorization to perform link recovery or link reinitialization from the upper level processor.

8. A system, comprising:
a memory; and
a processor coupled to the memory, wherein the processor performs operations, the operations comprising:
in response to detecting a link down condition of a link, holding the link by a lower level processor by transmitting an indication to indicate that an operational port facility that is ready for frame transmission and reception exists;
in response to the holding of the link, transmitting, by the lower level processor, a command to an upper level processor indicating the link down condition of the link; and
initiating, by the lower level processor, a process of link recovery for the link, in response to receiving an authorization from the upper level processor.

9. The system of claim 8, wherein the lower level processor processes lower level layers of a protocol stack, and wherein the upper level processor processes upper layers of the protocol stack.

10. The system of claim 9, wherein the protocol stack is for Fibre Channel, wherein the lower level layers include framing and signaling services, and wherein the upper level layers include at least one or more of extended link services, fabric services, Fibre Channel Protocol (FCP), and Fiber Connection (FICON).

11. The system of claim 10, wherein the upper level processor is a driver that is included in a host bus adapter of as storage controller, and wherein the lower level processor is a port firmware of an embedded port comprising a Fibre Channel interface chip embedded in the host bus adapter.

12. The system of claim 8, wherein the upper level processor on receiving the command indicating the link down condition of the link performs:
recovery actions including notifications to protocols layers to terminate active input/output (I/O) operations; and
sending the authorization to initiate the process of link recovery for the link to the lower level processor, subsequent to completing the recovery actions.

13. The system of claim 8, wherein the link is to a transmitter, and wherein the holding of the link by the lower level processor is for the transmitter, and wherein the link is held by the lower level processor by transmitting the IDLE ordered sets in Fibre Channel to indicate that an operational port facility ready for frame transmission and reception exists.

14. The system of claim 8, wherein:
in response to determining that the detected link down condition of the link is being caused by receipt of a Not Operational Sequence (NOS), the lower level processor transmits an Offline Sequence (OLS) in Fibre Channel and performs the holding of the link until receiving the authorization to perform link recovery or link reinitialization from the upper level processor; and
in response to determining that the detected link down condition of the link is being caused by a loss of signal or loss of synchronization, the lower level processor transmits an offline sequence (OLS) in Fibre Channel and performs the holding of the link until receiving the authorization to perform link recovery or link reinitialization from the upper level processor.

15. The system of claim 8, wherein the system is comprised of a Fibre Channel Interface chip.

16. The system of claim 8, wherein the system comprises a storage controller or a host bus adapter included in the storage controller.

17. A computer readable storage medium having computer readable program code embodied therewith, the computer readable program code configured to perform operations, the operations comprising:
in response to detecting a link down condition of a link, holding the link by a lower level processor by transmitting an indication to indicate that an operational port facility that is ready for frame transmission and reception exists;
in response to the holding of the link, transmitting, by the lower level processor, a command to an upper level processor indicating the link down condition of the link; and
initiating, by the lower level processor, a process of link recovery for the link, in response to receiving an authorization from the upper level processor.

18. The computer readable storage medium of claim 17, wherein the lower level processor processes lower level layers of a protocol stack, and wherein the upper level processor processes upper layers of the protocol stack.

19. The computer readable storage medium of claim 18, wherein the protocol stack is for Fibre Channel, wherein the lower level layers include framing and signaling services, wherein the upper level layers include at least one or more of extended link services, fabric services, Fibre Channel Protocol (FCP), and Fiber Connection (FICON), wherein the upper level processor is a driver that is included in a host bus adapter of as storage controller, and wherein the lower level processor is a port firmware of an embedded port comprising a Fibre Channel interface chip embedded in the host bus adapter.

20. The computer readable storage medium of claim 17, wherein the upper level processor on receiving the command indicating the link down condition of the link performs:
recovery actions including notifications to protocols layers to terminate active input/output (I/O) operations; and
sending the authorization to initiate the process of link recovery for the link to the lower level processor, subsequent to completing the recovery actions.

* * * * *